(12) United States Patent
Pouyollon

(10) Patent No.: US 7,073,096 B2
(45) Date of Patent: Jul. 4, 2006

(54) FILE PATH RESOLVING DEBUGGER

(75) Inventor: Xavier Pouyollon, Dilliec (FR)

(73) Assignee: Wind River Systems, Inc., Alameda, CA (US)

( * ) Notice: Subject to any disclaimer, the term of this patent is extended or adjusted under 35 U.S.C. 154(b) by 421 days.

(21) Appl. No.: 10/273,884

(22) Filed: Oct. 18, 2002

(65) Prior Publication Data
US 2004/0078688 A1    Apr. 22, 2004

(51) Int. Cl.
G06F 11/00    (2006.01)

(52) U.S. Cl. .......................... 714/38; 714/46; 717/125

(58) Field of Classification Search .................. 714/27, 714/38, 46; 717/125
See application file for complete search history.

(56) References Cited

U.S. PATENT DOCUMENTS

| | | | | |
|---|---|---|---|---|
| 5,437,029 | A * | 7/1995 | Sinha .......................... | 707/200 |
| 5,600,790 | A * | 2/1997 | Barnstijn et al. .............. | 714/38 |
| 5,675,803 | A * | 10/1997 | Preisler et al. ............... | 717/131 |
| 6,182,245 | B1 * | 1/2001 | Akin et al. .................... | 714/38 |
| 6,282,701 | B1 * | 8/2001 | Wygodny et al. ........... | 717/125 |
| 6,381,615 | B1 * | 4/2002 | Gaither et al. ............... | 707/200 |
| 6,397,246 | B1 * | 5/2002 | Wolfe .......................... | 709/217 |
| 6,493,806 | B1 * | 12/2002 | Royer et al. ................. | 711/156 |

OTHER PUBLICATIONS

Microsoft Press Computer Dictionary Third Edition, "mount", Microsoft Press, 1997, p. 315.*
Baker "Windows Error Messages" Aug. 2000, SmartComputing.com, vol. 11, Issue 8, pp. 42-46, [http://www.smartcomputing.com/editorial/article.asp?article=articles/2000/s1108/14s08/14s08.asp&guid=h0chk2d4].*
Software Development Systems, Inc., *SingleStep User Guide*, Version 7, 1996, pp. 1-1-C-88.

* cited by examiner

*Primary Examiner*—Scott Baderman
*Assistant Examiner*—Gabriel L. Chu
(74) *Attorney, Agent, or Firm*—Davidson, Davidson & Kappel LLC (57) ABSTRACT

A method for debugging an application running on a target device includes running a debugging program on a host device. A global path substitution is specified, the global path substitution indicating a first file path according to a file path convention of the host device to be substituted for a second file path according to a file path convention of the target device. The path substitution avoids file path ambiguities which may occur, for example, when the host attempts to access files having file paths referenced to the file path convention of the target device.

36 Claims, 5 Drawing Sheets

FILE PATH RESOLVING DEBUGGER

BACKGROUND

A computer program can be viewed as a detailed plan or procedure for solving a problem with a computer: an ordered sequence of computational instructions necessary to achieve such a solution. The distinction between computer programs and equipment is often made by referring to the former as software and the latter as hardware. An operating system is a set of programs that controls the interaction between applications and hardware. The operating system also controls the interaction between different applications. The operating system also provides generalized system services to application programs, such as utility and daemon programs. These system services conventionally include access to hardware peripheral devices attached directly or indirectly to the computer system. For example, an operating system provides access to system hardware (e.g., by device drivers), and access to the file system on the hardware (e.g., by file system utilities.)

During development of an embedded application, it is often advantageous to use a target and a host computing environment. The target is the device for which the application is being developed; and the host is used to develop the application for the target. The host may be used as a console for compiling new code and for monitoring debug output.

NFS (Network File System) is an example of a software package that allows a program running on the host system to access files located on the target device (and vice-versa), thus enabling an executable application that is located on the host system to run on the target device. To implement this, NFS mounts a directory on the target to a remote directory on the host. NFS supports mounting a directory on a UNIX based target to a remote directory on a Windows based host.

Programming objects are often used when writing a computer program. Programming objects simplify the logical thought process of writing a computer program.

A compiler is used to translate the computer program into machine code. It may be a task of considerable difficulty to write compilers for a given computer language, especially when the computer program is designed to operate on different types of hardware and operating systems. Compilers read the computer language, known as source code, from one or more source files. The source code is then translated into object code, which is the machine code representation of the source files. The object code is linked with other object code, e.g., libraries, to form an executable program.

A computer program may also be compiled not into machine language, but into an intermediate language that is close enough to machine language and efficient to interpret. However, the intermediate language is not so close that it is tied to the machine language of a particular computer. It is use of this approach that provides the Java language with its computer-platform independence.

Errors arise when a computer program is written, and consequently should be removed if the program is to operate correctly and efficiently. The process of removing the errors is known as "debugging". Since modern computer programs can encompass many lines of source code and can be arduous to understand, a program known as a debugger, or a debugging program, is used to simplify the task.

SUMMARY OF THE INVENTION

The present invention provides a method for debugging an application running on a target device, comprising: running a debugging program on a host device, and receiving a global path substitution indicating a first file path according to a file path convention of the host device to be substituted for a second file path according to a file path convention of the target device.

The present invention also provides a debugger for an application running on a target device. The debugger comprises a debugging program and a global path substitution module. The global file path substitution module is configured to substitute a first file path according to a file path convention of the host device for a second file path according to a file path convention of the target device.

A method for accessing, by a debugger running on a host device, a file of an application running on a target device, is also provided by the present invention. The method comprises receiving a global path substitution indicating a first file path according to a file path convention of the host device to be substituted for a second file path according to a file path convention of the target device, and locating the file using the global path substitution.

Also provided by the present invention is a computer readable medium having stored thereon computer executable process steps operative to perform a method for debugging an application running on a target device. The method comprises running a debugging program on a host device, and receiving a global path substitution indicating a first file path according to a file path convention of the host device to be substituted for a second file path according to a file path convention of the target device.

DETAILED DESCRIPTION

Conventional debuggers running on a host computing environment are unable to properly process references to different files, which share the same name, but are located in different directories on the target device. In such a system, the application being debugged is running on the target, while the debugger is running on the host. Usually, the host has access to the source files on the target via a mount directory, such as ". . . /unix/mount/", for example. However, it is possible for a local copy of the source files to be on the host as well.

The host and the target may use different file path conventions, e.g., different file systems and/or different directory structures. The host may use a WIN32 file system, for example, with the path of a given source file being "c:\DebugFiles/test/fool.c", for example ("/" and "\" being interchangeable in WIN32). The target, on the other hand, may use a UNIX-based file system, such as Fast File System (FFS), for example, with the path of the source file being "/a/b/c/exe/fool.c", for example. Alternatively, both the host and the target use the same file system, but have different directory structures, causing all or a portion of the respective file paths to be different on the two devices. For example, the path of a given source file on the host may be "c:\DebugCom\test\dummy.c", while the path on the target may be "d:\DebugSub\test\dummy.c".

When the debugger executes the application on the target, it parses the application to identify various source files. If a given source file was compiled on the host, the debugger will return information including a file path according to the host file path convention. The source file may then be accessed locally on the host. If the source file was compiled on the target, the debugger will return information including a file path according to the target file path convention. The path for the source file is referenced to the target, and therefore, the path is not the same path needed by the host.

For example, a directory ". . . /a/b/c" on a target may be mounted to mount directory ". . . /unix/mount/". The path to, for example, a file "fool.c" returned by the debugger during debugging might be ". . . /a/b/c/exe/fool.c", for example. However, the debugger will not find the file at that location, because that directory doesn't exist on the host. From the perspective of the host, the file is at ". . . /unix/mount/exe/fool.c." Therefore, the debugger will ask the user for a path name. The user will respond that the file is at ". . . /unix/mount/exe/fool.c", and the debugging process will proceed. The target might also include, for example, a file "fool.c" located in a shared object directory ". . . /a/b/c/sol/", the file therefore having path ". . . /a/b/c/sol/fool.c". If the debugger later finds a reference to ". . . /a/b/c/sol/fool.c.", it will look for ". . . /a/b/c/sol/fool.c", and when it doesn't find it, it will strip the path from the reference, and look for the file name "fool.c" in its prior search paths. The debugger will then find and use ". . . /unix/mount/exe/fool.c" even though the correct file is located at ". . . /unix/mount/sol/fool.c".

The present invention provides a method for debugging an application running on a target device, comprising: running a debugging program on a host device, and specifying to the debugging program a global path substitution indicating a first file path according to a file path convention of the host device to be substituted for a second file path according to a file path convention of the target device. The debugging program uses the global path substitution to find a source file of the application having a path according to the file path convention of the target device. The host device may have access to the source file on the target device, for example, via a mount directory, so the global path substitution may indicate that the mount directory on the host device is to be substituted for a file path on the target device. Alternatively, if the host device maintains a local copy of the source files, the global path substitution may indicate that the location of the local copy of the source files is to be substituted for a file path on the target device.

The specifying of the global path substitution may be performed by a user using a graphical user interface, for example.

The present invention also provides a debugger for an application running on a target device. The debugger comprises a debugging program and a global path substitution module. The global path substitution module is configured to substitute a first file path according to a file path convention of the host device for a second file path according to a file path convention of the target device.

In accordance with the present invention, the file path ambiguity problem is avoided by allowing the user to specify a global path substitution. The user may be prompted to provide a path substitution, and, in the example above, will indicate that "a/b/c" is to be replaced with "/unix/mount". The debugger will then go to "/unix/mount" each time it reads a path "a/b/c", thereby avoiding the problem discussed above. Use of the global path substitution also speeds debugger configuration, as the global path need only be specified once.

Different processes of the application running on the target device may have different global path substitutions, or a single global substitution may be specified. Multiple global path substitutions, even for one process, may be provided. The debugging program may attempt to access a file by try the multiple path substitutions in sequence.

Figure 1:
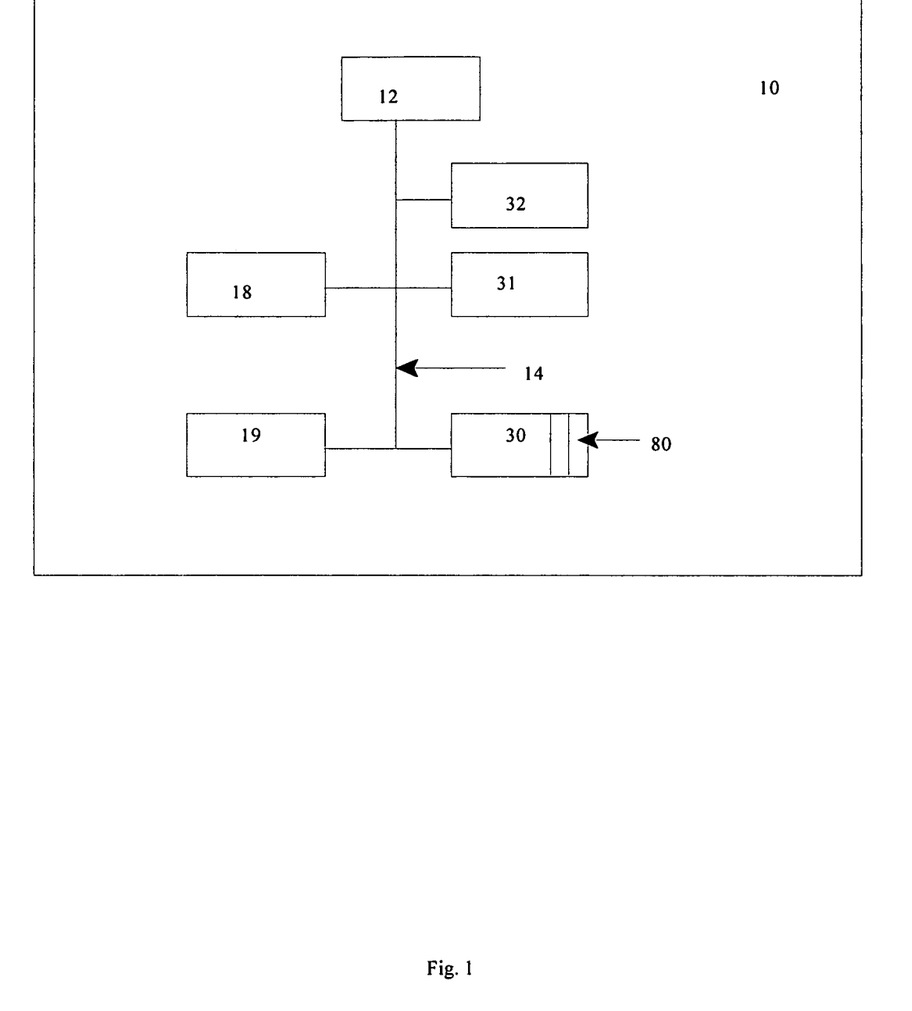
FIG. 1 shows a computer system.

FIG. 1 shows a computer system 10. Computer system 10 includes central processing unit (CPU) 12 coupled through system data bus 14 and network interface 18. Also included is non-volatile storage device (e.g., a hard drive) 30 and volatile storage device (e.g., RAM) 32. The operation of network interface 18 is sufficient to support the reading of data (e.g., executable, data, and configuration files) from a non-volatile resource (e.g., a hard drive). Video display device 19 is also provided as a peripheral device coupled to system bus 14. Other peripherals 31 may also function as part of computer system 10. These other peripherals 31 may include, for example, controllers supporting audio and real-time video, or SCSI device controllers. An operating system, which can be located on non-volatile storage device 30 or in volatile storage device 32, is configured to function with system data bus 14, network interface 18, video display device 19, non-volatile storage device 30, volatile storage device 32, and other peripherals 31. Located on non-volatile storage device 30 are plurality of files 80 arranged in a file system. The operating system uses files 80 to allow processes executing on system 10 to interact with the file system, other applications, or with devices 14,18,19,30,31, 32 on the system. For example, files 80 that define symbolic links can be used to facilitate communication with the file system. Likewise, files that specify device drivers can be used to allow the operating system to communicate with devices 14,18,19,30,31,32.

Figure 2:
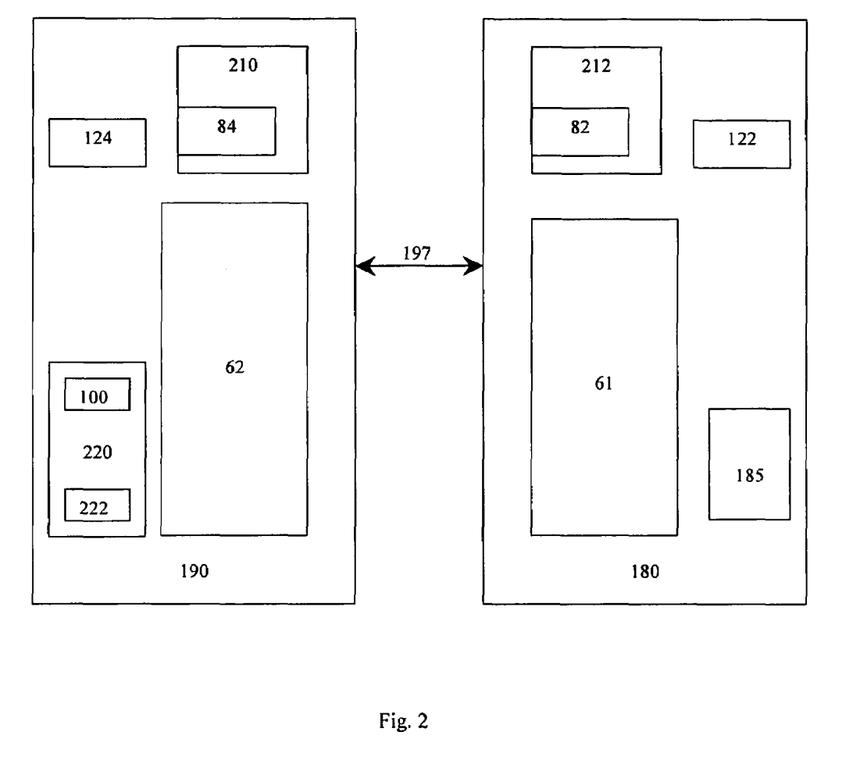
FIG. 2 shows a target device and a host device.

FIG. 2 shows a target computing environment 180 (hereinafter "target device") and a host computing environment 190 (hereinafter "host device"). The target device 180 and host device 190 may have the same architecture as the system 10 shown in FIG. 1. However, in certain embodiments according to the present invention, target device 180 may not include all devices, such as display device 19 or peripherals 31, for example. A communication link 197 is present between target device 180 and host device 190. The communication link 197, could be, for example, a wireless link (e.g., a wireless network) or a direct link (e.g., copper cable). In certain embodiments according to the present invention, the host device 190 is a dedicated server. In other embodiments of the present invention, the host device 190 could be a system comprising a plurality of processing devices (e.g., a distributed network or cluster).

Host operating system 62, for example Microsoft's Windows NT operating system, or another operating system, executes on host device 190. In the file system of host device 190, for example, a WIN32 file system, one or more files 84 are arranged in a directory structure 210. Directory structure 210 may reside on a hard drive or other storage device. Host device 190 includes CPU 124. Debugging program 220 runs on host device 190 and includes debugger engine 222 and global path substitution module 100, the function of which is described below. Debugging program 220 may be any suitable debugging program, such as the debugger of the Tornado® development suite of Wind River, modified to include global path substitution module 100, or the functionality thereof.

In other embodiments of the present invention, global path substitution module 100 may reside on host device 190 as a component or entity separate from debugging program 220. For example, global path substitution module 100 may be made up of one or more dynamic load libraries (DLL) which are accessed by debugger engine 222.

Target operating system 61, Wind River's BSD/OS operating system for example, executes on target device 180. In the file system of target device 180, for example the FFS file system, one or more files 82 are arranged into directory structure 212. Directory structure 212 may reside on a hard drive or other storage device. Target device 180 includes CPU 122. Application 185 runs on target device 180.

In some embodiments of the present invention, host device 190 and target device 180 may execute the same operating systems, and may use the same file systems.

Debugging program 220 running on host device 190 may be used to debug application 185 running on target device 180. As debugging program 220 executes application 185 the debugging program parses the application to identify various source files. A copy of application 185 including debug information will reside on host device 190, while a copy of application 185 without debug information will reside on target device 180. However, target device 180 may access files on host device 190 using an access program, such as NFS, for example.

Figure 3:
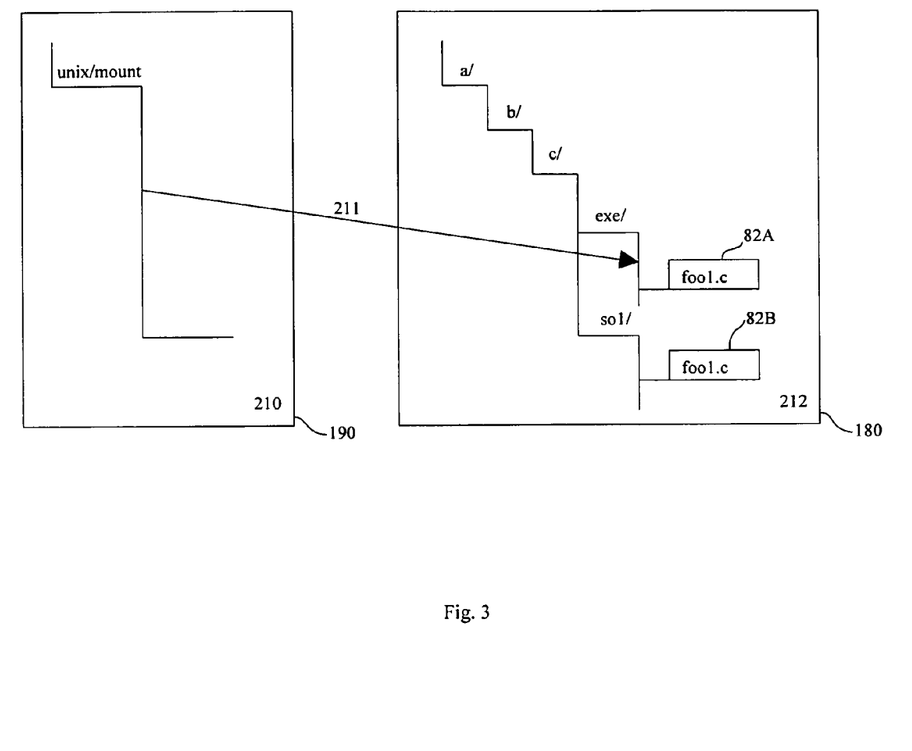
FIG. 3 shows a host device directory structure and a target device directory structure.

FIG. 3 shows directory structure 210 of host device 190 and directory structure 212 of target device 180. Directory structure 212 includes directories "a/", "b/", "c/", "exe/" and "sol/", arranged in path structure "a/b/c/exe/" and "a/b/c/sol/", as indicated. Directory "sol/" may be a shared object directory of directory "exe/". Directory "exe/" includes file 82A having file name "fool.c", while Directory "sol/" includes file 82B also having file name "fool.c". Files 82A and 82B may be source files of application 185 (see FIG. 2).

Directory structure 210 includes mount directory "C:\unix\mount". Host device 190 may access files in directory structure 212 on target device 180 via directory "C:\unix\mount", as indicated by arrow 211. The mechanism of mounting a directory on a target device to a remote directory on a host device is known to those of skill in the art. NFS server, for example, supports mounting. In other embodiments of the present invention, other tools, programs, etc., may be used to enable host device 190 to access files on target device 180. Naturally, NFS server (or another tool or program) can likewise be used to allow the target device 180 to access files on the host device 190 (e.g., through a mount directory). This is often advantageous when the target device does not include any non-volatile memory.

Since subdirectory "a/b/c/exe/" does not exist on host device 190, upon an attempted access by the host device of file 82A, a user input may be required indicating the path "C:\unix\mount\exe\fool.c" of file 82A. As described above, a file path ambiguity may occur upon subsequent attempt by host device 190 to access file 82B, having the same name as file 82A, but being located in a different subdirectory on target device 180.

This file path ambiguity can be avoided according to the present invention by providing the user the capability to specify a global path substitution: "a/b/c" is to be replaced with "C:\unix\mount". Debugging program 220 will then go to directory "C:\unix\mount" each time it reads a path "a/b/c"; avoiding the ambiguity. According to the present invention, the path substitution is specified for a "root" portion of the target path. Subdirectory portions of the path remain unchanged. For example, path "a/b/c/exe/fool.c" according to the target file path convention becomes, upon path substitution, "c:\unix\mount/exe/fool.c" according to the host file path convention. Subdirectory portion "/exe/fool.c" remains unchanged in the path, only host path root portion "a/b/c" is substituted for target path root portion "C:\unix\mount".

The global path substitution may be inputted via a GUI, command entry line, or other suitable interface. Respective global path substitutions may be specified for respective processes of application 185 running on target device 180. Alternatively, a single global path substitution may be specified. In other embodiments of the present invention, a list of multiple global path substitutions may be provided for one process. Debugging program 220 may attempt to access file 82A or 82B, for example, by trying multiple path substitutions in sequence.

Figure 4:
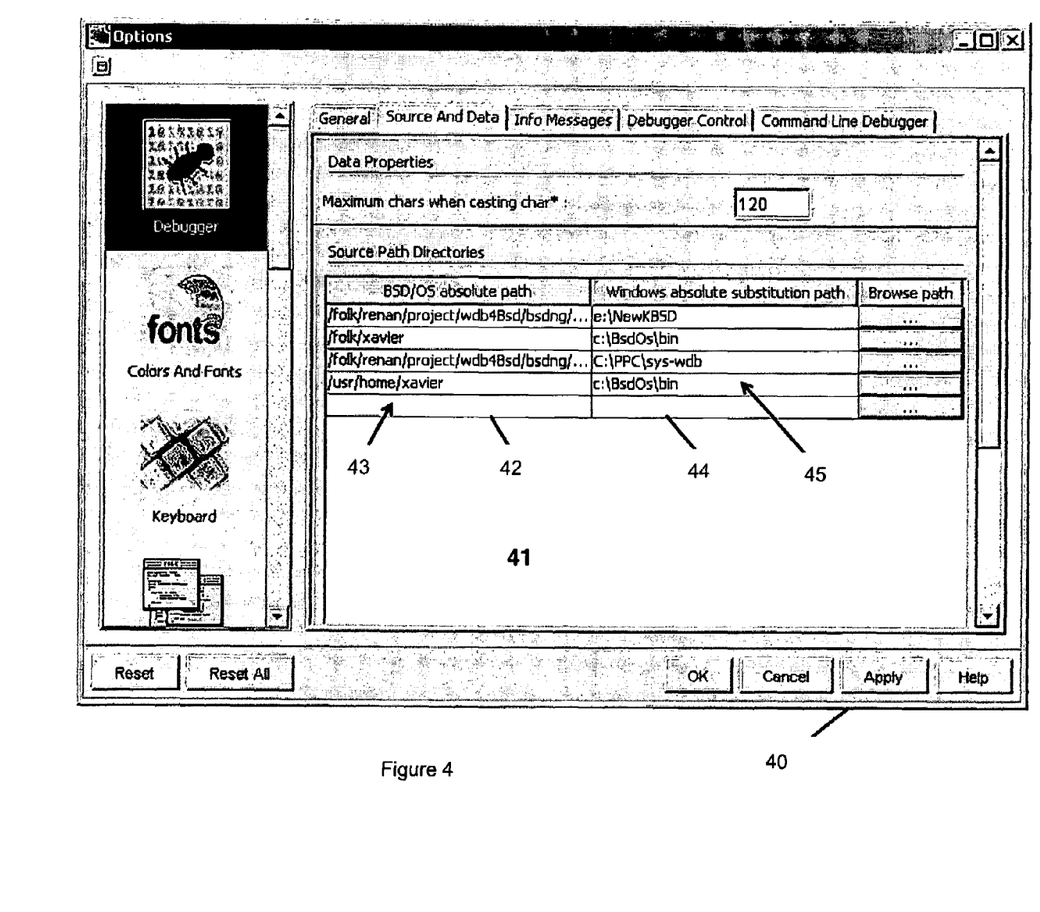
FIG. 4 shows a graphical user interface (GUI) for inputting global path substitutions.

FIG. 4 shows an example of a GUI 40 for inputting one or more global path substitutions. Dialog box 41 includes columns 42 and 44. Column 42 provides entry lines 43 for entering BSD/OS absolute paths of the target device. Column 44 provides entry lines 45 for entering a respective Windows absolute substitution path of the host device which is desired to be substituted for each respective entered BSD/OS absolute path. When debugging program 220 reads a path entered in column 42, the debugging program will then automatically go to the corresponding substitute path entered in column 44. In the GUI depicted, a path in the file system of the target device (e.g., FFS) is associated with a corresponding path in the different file system of the host device (e.g., WIN32) that is to be substituted for the target path indicated. In embodiments where the host device and target device use the same file system but have different file structures, the path substitutions relate a path in the directory structure of the host device (column 44) to a path in the directory structure of the target device (column 42).

As indicated above, debugging program 220 may try the path substitutions in sequence. For example, using the list of path substitutions shown in FIG. 4, for an identified source file path "/folk/xavier/test/dummy.c", the debugging program will first look at the first substitution entry in column 42, absolute path "/folk/renan/project/wdb4Bsd/bsdng/ . . .". Because the source file path does not begin with "/folk/renan/", the debugging program will then look at the next substitution entry in column 42, absolute path target path "/folk/xavier". Because the identified source file path does start with "/folk/xavier", the path "c:\BsdOs\bin" from column 44 will be substituted for the target path "/folk/xavier", giving a resulting substituted path "c:\BsdOs\bin/test/dummy.c".

Corresponding path substitution pairs from columns 42 and 44 may reside in a lookup table, data base, or other suitable data structure on host device 190. As noted above, other types of user interfaces may be provided, depending on the particular embodiment of the present invention.

GUI 40 may interface with global path substitution module 100 for effecting path substitutions. The functionality of GUI 40 may be provided by global path substitution module 100, which module may be a software object or other suitable component. As noted above, global path substitution module 100 (see FIG. 2) may be integrated with debugging program 220 or provided as a separate tool or other entity. Moreover, additional or alternative dialog boxes may be provided for specifying one or more processes to which a global path substitution applies, or for specifying multiple global path substitutions to be tried by debugging program 220 in sequence, etc., depending on the particular embodiment of the present invention.

Figure 5:
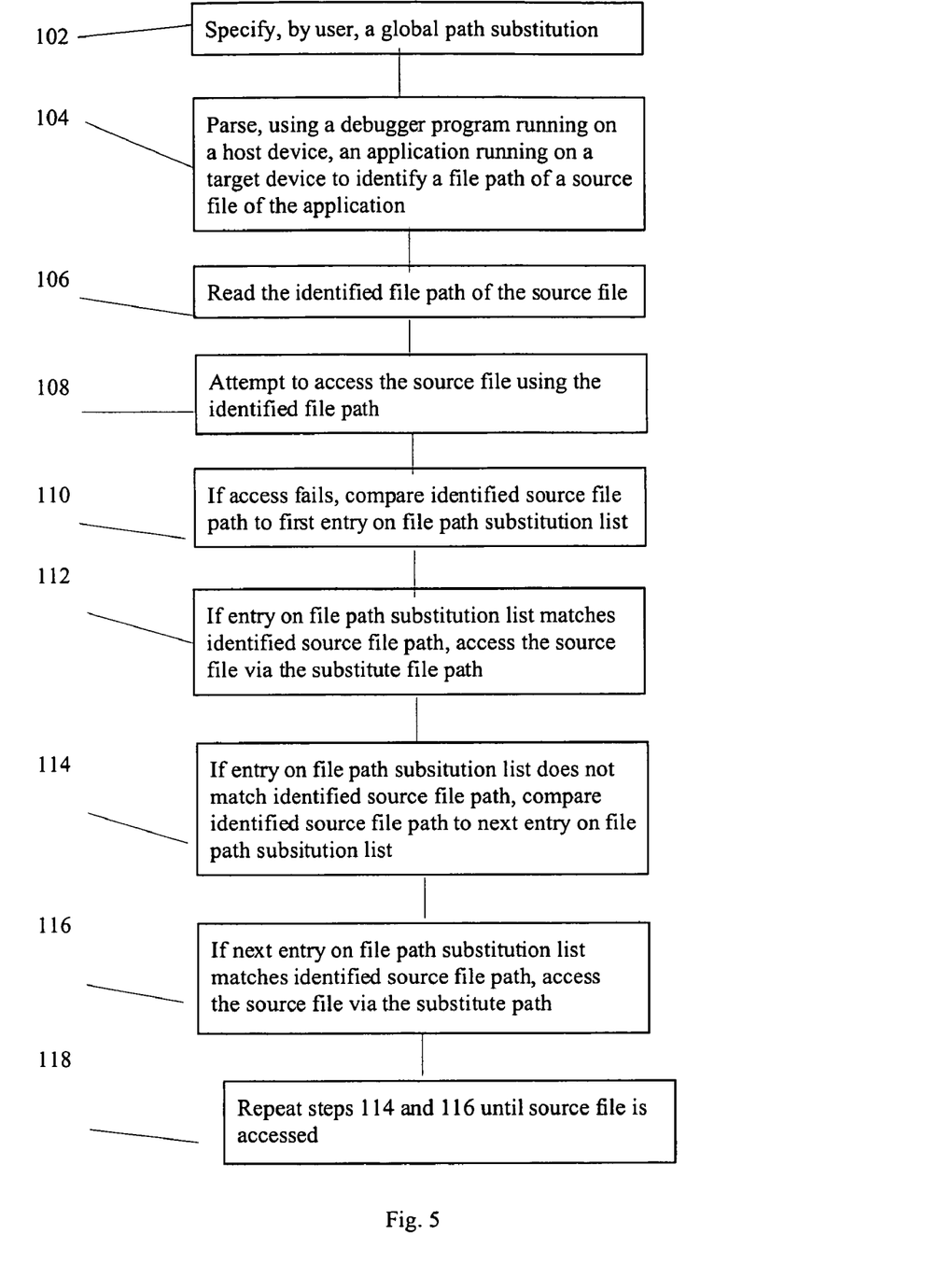
FIG. 5 shows a method for debugging an application running on a target device using a debugging program running on a host device.

FIG. 5 shows a method for debugging an application running on a target device using a debugging program running on a host device. First, a global path substitution is specified by a user (step 102). The global path substitution specifies a file path according to a file path convention of the host device to be substituted for a file path according to a file path convention of the target device. In some embodiments of the present invention, the global path substitution may be specified automatically or as a result of other processes, objects, or routines. The application running on the target device is parsed, using the debugging program running on the host device, to identify a file path of a source file of the application (step 104). The identified file path of the source file is read (step 106). The debugger will attempt to access the source file on the host device (step 108) and will access the file on the host device if the identified file path conforms to the file path convention of the host device. If the access attempt fails, i.e., if the identified file path conforms to the file path convention of the target device and is therefore not accessible on the host device, the identified source file is compared to the first entry on the file path substitution list (step 110). If the first entry on the file path substitution list matches the identified source file path, the source file is accessed via the substitute file path (step 112). If the first entry on the file path substitution list does not match the identified source file path, the identified source file path is compared to the next entry on file path substitution list (step 114). If the next entry on the file path substitution list matches the identified source file path, the source file is accessed via the substitute path (step 116). Steps 114 and 116 are repeated until the source file is successfully accessed (step 118). Thus, where the identified file path conforms to the file path convention of the target device and is therefore not accessible on the host device, the debugging program accesses the source file via an appropriate substitute path.

The substitute path may include a mount directory, such as "c:\unix\mount", for example. NFS server, for example, may be used to effect the mounting. In some embodiments of the present invention, where a copy of the identified source file resides on the host device, the substitute path need not include a mount directory.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for debugging an application running on a target device, comprising:
    running a debugging program on a host device; and
    receiving, via a graphical user interface, a global path substitution indicating a first file path according to a file path convention of the host device to be substituted for a second file path according to a file path convention of the target device, wherein the second file path includes a directory mounted to a directory on the host.

2. The method as recited in claim 1 wherein the first file path includes a mount directory.

3. The method as recited in claim 1 wherein the host device and the target device use a same operating system.

4. The method as recited in claim 1 further comprising accessing by the debugging program a source file of the application using the global path substitution.

5. The method as recited in claim 4 wherein the source file resides on the host device.

6. The method as recited in claim 4 wherein the source file resides on the target device.

7. The method as recited in claim 1 wherein the global path substitution applies to a plurality of processes of the application.

8. The method as recited in claim 1 wherein the first file path is a file path of a source file of the application.

9. The method as recited in claim 8 wherein the source file is compiled on the target device.

10. The method as recited in claim 1 further comprising attempting to access, on the host device, a source file of the application, and when the source file is not accessible on the host device, accessing the source file using the global path substitution.

11. The method as recited in claim 1 wherein the file path convention of the host device includes a first file system and the file path convention of the target device includes a second file system.

12. The method as recited in claim 11 wherein the first file system is the same as the second file system.

13. The method as recited in claim 1 wherein the file path convention of the host device includes a first directory structure and the file path convention of the target device includes a second directory structure.

14. A method for debugging an application running on a target device, comprising:
    running a debugging program on a host device; and
    receiving, via a graphical user interface, a global path substitution indicating a first file path according to a file path convention of the host device to be substituted for a second file path according to a file path convention of the target device, wherein the global path substitution applies to a first process of the application and further comprising receiving a second global path substitution applicable to a second process of the application.

15. A method for debugging an application running on a target device, comprising:
    running a debugging program on a host device; and
    receiving, via a graphical user interface, a global path substitution indicating a first file path according to a file path convention of the host device to be substituted for a second file path according to a file path convention of the target device,
    receiving a second global path substitution indicating a third file path according to the file path convention of the host device to be substituted for a fourth file path according to the file path convention of the target device.

16. The method as recited in claim 15 further comprising attempting to access a desired file by the debugging program using the first and the second global path substitutions sequentially.

17. A method for debugging an application running on a target device, comprising:
    running a debugging program on a host device; and
    receiving, via a graphical user interface, a global path substitution indicating a first file path according to a file path convention of the host device to be substituted for a second file path according to a file path convention of the target device, wherein the file path convention of the host device includes a Windows-based file system and the file path convention of the target device includes a UNIX-based file system.

18. A method for debugging an application running on a target device, comprising:
- running a debugging program on a host device; and
- receiving, via a graphical user interface, a global path substitution indicating a first file path according to a file path convention of the host device to be substituted for a second file path according to a file path convention of the target device, wherein the first file path is a first root portion of the file path convention of the host device and the second file path is a second root portion of the file path convention of the target device.

19. A method for accessing, by a debugger running on a host device, a file of an application running on a target device, comprising:
- mounting a first directory on the target device to a second directory on the host device;
- receiving, via a graphical user interface, a first file path according to a file path convention of the host device to be substituted for a second file path according to a file path convention of the target device; and
- locating the file using the global path substitution.

20. A debugger for an application running on a target device, the debugger stored on a computer readable medium and comprising:
- a debugger engine; and
- a global path substitution module including a graphical user interface, said module configured to substitute a first file path according to a file path convention of the host device for a second file path according to a file path convention of the target, wherein the second file path includes a directory mounted to a directory on the host device.

21. The debugger as recited in claim 20 wherein the global file path substitution module is capable of receiving a user input specifying the first file path.

22. The debugger as recited in claim 20 wherein the graphical user interface is configured to receive a user input specifying the first file path.

23. The debugger as recited in claim 20 wherein the first file path includes a mount directory.

24. The debugger as recited in claim 20 wherein the host device and the target device use a same operating system.

25. The debugger as recited in claim 20 wherein the debugger is configured to access a file of the application using the second file path.

26. The debugger as recited in claim 20 wherein the global path substitution module is further configured to perform the path substituting for a plurality of processes of the application.

27. The debugger as recited in claim 20 wherein the file path convention of the host device includes a first file system and the file path convention of the target device includes a second file system.

28. The debugger as recited in claim 27 wherein the first file system is a Windows-based file system and the second file system is a UNIX-based file system.

29. The debugger as recited in claim 27 wherein the first file system is the same as the second file system.

30. The debugger as recited in claim 20 wherein the file path convention of the host device includes a first directory structure and the file path convention of the target device includes a second directory structure.

31. A debugger for an application running on a target device, the debugger stored on a computer readable medium and comprising:
- a debugger engine; and
- a global path substitution module including a graphical user interface, said module configured to substitute a first file path according to a file path convention of the host device for a second file path according to a file path convention of the target, wherein the first file path is a first root portion of the file path convention of the host device and the second file path is a second root portion of the file path convention of the target device.

32. A debugger for an application running on a target device, the debugger stored on a computer readable medium and comprising:
- a debugger engine; and
- a global path substitution module including a graphical user interface, said module configured to substitute a first file path according to a file path convention of the host device for a second file path according to a file path convention of the target, wherein the host device uses a WIN32 operating system and the target device uses a UNIX operating system.

33. A debugger for an application running on a target device, the debugger stored on a computer readable medium and comprising:
- a debugger engine; and
- a global path substitution module including a graphical user interface, said module configured to substitute a first file path according to a file path convention of the host device for a second file path according to a file path convention of the target, wherein the global path substitution module is further configured to perform the path substituting for a first process of the application and to perform a second global path substitution for a second process of the application.

34. A debugger for an application running on a target device, the debugger stored on a computer readable medium and comprising:
- a debugger engine; and
- a global path substitution module including a graphical user interface, said module configured to substitute a first file path according to a file path convention of the host device for a second file path according to a file path convention of the target, wherein the global path substitution module is further configured to substitute a third file path according to the file path convention of the host device for a fourth file path according to the file path convention of the target device.

35. The debugger as recited in claim 34 wherein the debugger is configured to attempt to access a desired file by attempting to perform, sequentially, the substituting of the first file path and the substituting of the third file path.

36. A computing system comprising:
- a target device running an application; and
- a host device running a debugging program including a graphical user interface configured to debug the application, the host device being capable of receiving a global path substitution useable by the debugging program to substitute a first file path according to a file path convention of the host device for a second file path according to a file path convention of the target device, wherein the second file path includes a first directory of the target device, the first directory being mounted to a second directory on the host device.

* * * * *